Patented Apr. 3, 1945

2,373,003

UNITED STATES PATENT OFFICE 2,373,003

METHOD OF PRODUCING QUINONES

Richard T. Arnold, Minneapolis, Minn., assignor to Regents of the University of Minnesota, Minneapolis, Minn., a corporation of Minnesota No Drawing. Application April 30, 1941,
Serial No. 391,219

14 Claims. (Cl. 260—396)

This invention relates to process of producing quinones and substituted quinones and particularly to quinones of the benzene, naphthalene, anthracene and pyrene series.

It is a principal object of the invention to provide clean and efficient processes for the production of quinones and substituted quinones utilizing economical ingredients and wherein the final products are produced in good yields and are easily separated and purified.

The invention is of especial usefulness in the preparation of final products and intermediates of the quinone type and particularly for preparing 2-methyl-1,4-naphthoquinone, a compound having especially high vitamin K activity.

In carrying out the invention, an appropriate hydrocarbon of the benzene, naphthalene, benzanthracene or pyrene series is selected as the starting ingredient.

As the hydrocarbon starting materials suitable for use in the present invention, there may be used 1,4 unsubstituted benzenes having more than two positions substituted, unsubstituted naphthalene, 2-alkyl substituted naphthalenes, 2,3-dialkyl substituted naphthalenes, 1-aldehyde substituted naphthalenes, benzanthracene or pyrene.

The selected starting material is subjected to the action of perhydrol (approximately 30% hydrogen peroxide) in a suitable solvent and at elevated temperatures. The solvent must be such that it will dissolve the starting material and perhydrol and must not promote the decomposition of the reactants or resultant products. Glacial acetic acid fulfills these requirements and is preferably used as the solvent, particularly because of its ready availability and low cost, although dioxane may also be used. The reaction is carried out at a temperature of from 30°–125° C., depending upon the type of hydrocarbon starting material used and upon manipulative factors, for a period ranging from a few minutes to a number of hours, depending upon the temperature used in the reaction, and the inherent reactability of the starting materials used.

The reaction usually proceeds with characteristic color change, a yellow color being developed followed by a gradual change to cherry red.

The yields of final quinone products are good, and recovery of the products in pure form is made by crystallization, steam distillation or sublimation, depending upon the characteristics of the final products.

The invention is illustrated by the following specific examples which, however, are not to be considered as limitations upon the invention.

Example I

A reaction mixture of 5 grams of durene, in 50 cc. of glacial acetic acid containing 25 cc. of perhydrol (30% hydrogen peroxide) was heated on a steam bath for fifteen hours. Thereafter, most of the solvent, glacial acetic acid, was removed by distillation and the residue was steam distilled, and 2.1 grams of pure duroquinone having a melting point of 110–111° C., was isolated as a precipitate for the distillate. A mixed melting point determination with an authentic sample gave no depression.

Example II

A solution containing 4.03 grams of 1-naphthaldehyde in 80 cc. of glacial acetic acid was treated with 25 cc. of perhydrol (30% hydrogen peroxide) on a steam bath. Within fifteen minutes the solution developed a yellow color, which as the reaction progressed, changed into a cherry red color. The solution was concentrated by removal of half of the solvent by distillation, and water was added drop by drop until precipitation began. Two crops of crystals of 1,4 naphthoquinone were collected, the total yield being 1.1 grams. The 1,4 naphthoquinone had a melting point of 124–125° C., and a mixed melting point determination with an authentic sample of the same material proved identity of the resultant product.

Example III

A mixture composed of 10 grams of naphthalene, 25 cc. of perhydrol and 50 cc. of acetic acid was heated together at just above 80° C. for forty-five minutes. The volume of the reaction mixture was thereafter reduced to half by direct distillation at atmospheric pressure. Water was then added slowly until crystallization began. The first crop of 1,4-naphthoquinone obtained melted at 121–125° C., and a second crop began to melt at 115° C. After recrystallization a 20% yield of the 1,4-naphthoquinone was obtained.

Example IV

Five grams of 2-methyl naphthalene was dissolved in 75 cc. of glacial acetic acid solvent and warmed to 50° C. To this was added 15 cc. of perhydrol and the mixture was allowed to stand at 80° for 10 hours. After an inductive period during which no reaction apparently took place, the solution began to turn yellow and then gradually developed a cherry red color. The solvent was evaporated and the material then steam distilled yielding 1.8 grams (30%) of 2-methyl-1,4-naphthoquinone having a melting point of 104–105° C. The identity of the composition was shown by the fact that a mixed melting point determined with an authentic sample gave no depression in the melting point.

Example V

Five grams of 2,3 dimethyl naphthalene was dissolved in 75 cc. of glacial acetic acid and warmed to 50° C. To this, there was added 15 cc. of perhydrol and the mixture treated in precisely the same way as in Example IV. The resultant product (2,3 dimethyl-1,4 naphthoquinone) was obtained without steam distillation in a 78% yield. The product had a melting point of 127° C.

Example VI

One gram of 1,2-benzanthracene was dissolved in 30 cc. of glacial acetic acid and 5 cc. of perhydrol was added. The solution was heated under reflux to the boiling point of the glacial acetic acid solvent, i. e., approximately 115° C., and the flame removed. The exothermic reaction which ensued caused the mixture to continue refluxing for an additional ten minutes after which heating was continued for twenty minutes longer. The entire reaction mixture was then poured into cool water and a finely divided precipitate, which separated out, was collected by centrifuging. The precipitate was recrystallized twice from acetic acid and had a melting point of 158–160° C., and had a slight red color. The crystallized material 1,2-benzanthraquinone-9,10 was sublimed and the sublimate after recrystallization weighed 0.52 gram (46%), and melted at 166–167° C. The red color was removed by the process of sublimation.

Example VII

The mixture of five grams of pyrene in 80 cc. of acetic acid was heated to the boiling point of glacial acetic acid and 25 cc. of perhydrol was added. After refluxing for twenty minutes at approximately 115° C., the reaction mixture was poured into cold water and a reddish precipitate was collected and dried. It weighed 5.1 grams. This material is believed to be a mixture of 3,8- and 3,10-pyrene quinones, and was capable of being completely reduced by sodium hydrosulfite, showing that the product mixture consisted entirely of quinones.

The quinone products produced in accordance with this invention are of particular usefulness as intermediates, and in some instances, have individual usefulness. Thus, 2-methyl-1,4 naphthoquinone has high vitamin K activity and may be used therefor; 1,2-benzanthracene-9,10 is useful as an intermediate in the preparation of carcinogenic substances.

Many obvious variations may be made in the present invention without departing from the scope of the invention herein described and claimed.

I claim as my invention:

1. The process of producing quinones which comprises in the absence of a catalyst reacting an aromatic hydrocarbon selected from the class consisting of benzene having the 1 and 4 position unsubstituted and alkyl substituents in more than two positions, unsubstituted naphthalene, 2-alkyl substituted naphthalene, 2,3-dialkyl substituted naphthalene, 1-aldehyde substituted naphthalene, 1,2-benzanthracene and pyrene, with approximately 30% concentration hydrogen peroxide in a solvent at elevated temperatures, continuing said reaction for a time period of 15 minutes to 15 hours, depending upon the hydrocarbon used, until the corresponding quinone is formed and then separating the thus formed quinone.

2. The process of producing quinones which comprises in the absence of a catalyst reacting an aromatic hydrocarbon selected from the class consisting of benzene having the 1 and 4 position unsubstituted and alkyl substituents in more than two positions, unsubstituted naphthalene, 2-alkyl substituted naphthalene, 2,3-dialkyl substituted naphthalene, 1-aldehyde substituted naphthalene, 1,2-benzanthracene and pyrene with approximately 30% concentration hydrogen peroxide in glacial acetic acid, at elevated temperatures, continuing said reaction for a time period of 15 minutes to 15 hours, depending upon the hydrocarbon used, until the corresponding quinone is formed and then separating the thus formed quinone.

3. The process of producing quinones which comprises in the absence of a catalyst reacting an aromatic hydrocarbon selected from the class consisting of benzene having the 1 and 4 position unsubstituted and alkyl substituents in more than two positions, unsubstituted naphthalene, 2,3-dialkyl substituted naphthalene, 1-aldehyde substituted naphthalene, 1,2-benzanthracene and pyrene with approximately 30% concentration hydrogen peroxide in glacial acetic acid at a temperature between 30° C. and 125° C., continuing said reaction for a time period of 15 minutes to 15 hours, depending upon the hydrocarbon used, until the corresponding quinone is formed and then separating the thus formed quinone.

4. The process which comprises in the absence of a catalyst reacting 2-methyl naphthalene with approximately 30% concentration hydrogen peroxide in a solvent at elevated temperatures for about 10 hours and then separating the thus formed 2-methyl-1,4-naphthoquinone.

5. The process which comprises in the absence of a catalyst reacting 2-methyl naphthalene with perhydrol in glacial acetic acid at an elevated temperature for about 10 hours and then separating the thus formed 2-methyl-1,4-naphthoquinone.

6. The process which comprises in the absence of a catalyst heating a mixture 2-methyl naphthalene in glacial acetic acid, then adding perhydrol and heating for several hours at an increased temperature and then separating the thus formed 2-methyl-1,4-naphthoquinone.

7. The process which comprises in the absence of a catalyst heating a mixture of 2-methyl naphthalene in glacial acetic acid to about 50° C., adding hydrogen peroxide of about 30% concentration and continuing the reaction by allowing the mixture to stand at about 80° C. for about 10 hours and then separating the thus formed 2-methyl-1,4-naphthoquinone.

8. The process of producing quinones by limited direct oxidation which comprises reacting a benzenoid compound having a reactivity level in excess of that of the dialkyl substituted benzenes and selected from the group consisting of benzene having positions available for quinone formation and alkyl substituents in more than two positions, unsubstituted naphthalene, 2-alkyl substituted naphthalene, 2,3-dialkyl substituted naphthalene, 1-aldehyde substituted naphthalene, 1,2-benzanthracene and pyrene, with hydrogen peroxide of about 30% concentration, said reaction being carried out in a solvent capable of dissolving the benzenoid compound and hydrogen peroxide, the solvent being further characterized in that it does promote the decomposition of the reactants or resultant quinones, said reaction being carried out in the absence of a catalyst, continuing said reaction only until quinones are produced and then interrupting the reaction and separating the thus formed quinones.

9. The process of producing quinones by limited direct oxidation which comprises reacting a benzenoid compound having a reactivity level in excess of that of the dialkyl substituted benzenes and selected from the group consisting of benzene having positions appropriate for quinone formation and alkyl substituents in more than two positions, unsubstituted naphthalene, 2-alkyl substituted naphthalene, 2,3-dialkyl substituted naphthalene, 1-aldehyde substituted naphthalene, 1,2-benzanthracene and pyrene, with hydrogen peroxide of about 30% concentration, said reaction being carried out in glacial acetic acid solvent and in the absence of a catalyst, continuing said reaction only until quinones are produced and then interrupting the reaction and separating the thus formed quinones.

10. The process of producing quinones by limited direct oxidation which comprises reacting a benzenoid compound having a reactivity level in excess of that of the dialkyl substituted benzenes and selected from the group consisting of benzene having positions appropriate for quinone formation and alkyl substituents in more than two positions, unsubstituted naphthalene, 2-alkyl substituted naphthalene, 2,3-dialkyl substituted naphthalene, 1-aldehyde substituted naphthalene, 1,2-benzanthracene and pyrene, with perhydrol, said reaction being carried out in glacial acetic acid solvent and in the absence of a catalyst, continuing said reaction only until quinones are produced and then interrupting the reaction and separating the thus formed quinones.

11. The process of producing quinones by limited direct oxidation which comprises reacting a benzenoid compound having a reactivity level in excess of that of the dialkyl substituted benzenes and selected from the group consisting of benzene having the positions appropriate for quinone formation and alkyl substituents in more than two positions, unsubstituted naphthalene, 2-alkyl substituted naphthalene, 2,3-dialkyl substituted naphthalene, 1-aldehyde substituted naphthalene, 1,2-benzanthracene and pyrene, with hydrogen peroxide of approximately 30% concentration, said reaction being carried out in glacial acetic acid solvent at a temperature of 30° to 125° C. and in the absence of a catalyst, continuing said reaction only until quinones are produced and then interrupting the reaction and separating the thus formed quinones.

12. The process of producing 2-methyl-1,4-naphthoquinone which comprises reacting 2-methyl naphthalene with hydrogen peroxide of approximately 30% concentration at a temperature between 30° C. and 125° C. in the presence of a solvent but without a catalyst, said reaction being continued until a cherry red color is developed, and thereafter separating the thus formed 2-methyl-1,4-naphthoquinone.

13. The process of producing 2-methyl-1,4-naphthoquinone which comprises reacting 2-methyl naphthalene and perhydrol in glacial acetic acid solvent in the absence of a catalyst at a temperature of about 30° C. to 125° C. until a cherry red color is developed, and thereafter separating the thus formed 2-methyl-1,4-naphthoquinone.

14. The process of producing 2-methyl-1,4-naphthoquinone which comprises reacting 2-methyl naphthalene and perhydrol in the proportions of about 5 grams of the former to about 15 cc. of the latter, the reaction being carried out in glacial acetic acid in the absence of a catalyst at a temperature of about 80° C. until a cherry red color is developed, and then separating the thus formed 2-methyl-1,4-naphthoquinone.

RICHARD T. ARNOLD.